United States Patent
Suzuki et al.

(10) Patent No.: US 11,651,767 B2
(45) Date of Patent: May 16, 2023

(54) METRIC LEARNING OF SPEAKER DIARIZATION

(71) Applicant: INTERNATIONAL BUSINESS MACHINES CORPORATION, Armonk, NY (US)

(72) Inventors: Masayuki Suzuki, Tokyo (JP); Yosuke Higuchi, Saitama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 269 days.

(21) Appl. No.: 16/807,892

(22) Filed: Mar. 3, 2020

(65) Prior Publication Data

US 2021/0280169 A1    Sep. 9, 2021

(51) Int. Cl.
*G10L 15/06* (2013.01)
*G10L 15/02* (2006.01)
*G10L 15/22* (2006.01)
*G06N 20/00* (2019.01)

(52) U.S. Cl.
CPC ............ *G10L 15/063* (2013.01); *G06N 20/00* (2019.01); *G10L 15/02* (2013.01); *G10L 15/22* (2013.01)

(58) Field of Classification Search
CPC ....... G10L 15/22; G10L 15/02; G10L 15/063; G10L 25/51; G10L 17/04; G06N 20/00; G06N 3/084; G06N 3/0454; G06F 9/485
See application file for complete search history.

(56) References Cited

U.S. PATENT DOCUMENTS

| | | | |
|---|---|---|---|
| 6,411,930 B1 | 6/2002 | Burges | |
| 8,554,563 B2 | 10/2013 | Aronowitz | |
| 9,542,948 B2 | 1/2017 | Roblek et al. | |
| 9,640,197 B1 | 5/2017 | Fukuda et al. | |
| 9,715,660 B2 | 7/2017 | Parada San Martin et al. | |
| 10,008,209 B1 | 6/2018 | Qian et al. | |
| 10,140,980 B2 | 11/2018 | Bengio et al. | |
| 10,403,291 B2 | 9/2019 | Moreno et al. | |
| 10,529,320 B2 | 1/2020 | Shafran et al. | |
| 10,693,872 B1 | 6/2020 | Larson et al. | |
| 10,878,840 B1 | 12/2020 | Mitchell et al. | |
| 10,959,018 B1 * | 3/2021 | Shi | G06N 20/00 |
| 11,080,596 B1 * | 8/2021 | Makhijani | G06N 3/08 |
| 11,082,438 B2 * | 8/2021 | Peinador | G06F 21/552 |

(Continued)

OTHER PUBLICATIONS

Deng et al., "ArcFace: Additive Angular Margin Loss for Deep Face Recognition", Proceedings of the 2019 IEEE Conference on Computer Vision and Pattern Recognition. Jun. 16-20, 2019. (pp. 4690-4699.).

(Continued)

*Primary Examiner* — Michael Colucci
(74) *Attorney, Agent, or Firm* — Tutunjian & Bitetto, P.C.; Randy Emilio Tejeda

(57) ABSTRACT

A computer-implemented method includes obtaining training data including utterances of speakers in acoustic conditions, preparing at least one machine learning model, each machine learning model including a common embedding model for converting an utterance into a feature vector and a classification model for classifying the feature vector, and training, by using the training data, the machine learning model to perform classification by speaker and to perform classification by acoustic condition.

17 Claims, 8 Drawing Sheets

(56) References Cited

U.S. PATENT DOCUMENTS

| | | | |
|---|---|---|---|
| 11,182,691 B1* | 11/2021 | Zhang | G06N 20/00 |
| 11,223,699 B1 | 1/2022 | Niewczas | |
| 11,366,966 B1* | 6/2022 | Ramsey | G06F 40/295 |
| 2004/0230420 A1 | 11/2004 | Kadambe et al. | |
| 2009/0319269 A1 | 12/2009 | Aronowitz | |
| 2010/0161327 A1 | 6/2010 | Chandra et al. | |
| 2010/0322428 A1* | 12/2010 | Fukui | H04S 7/30 381/17 |
| 2013/0006635 A1 | 1/2013 | Aronowitz | |
| 2016/0283185 A1* | 9/2016 | McLaren | G10L 25/54 |
| 2017/0287490 A1 | 10/2017 | Biswal et al. | |
| 2018/0254051 A1 | 9/2018 | Church et al. | |
| 2018/0349158 A1 | 12/2018 | Swersky et al. | |
| 2019/0043508 A1 | 2/2019 | Sak et al. | |
| 2019/0066713 A1 | 2/2019 | Mesgarani et al. | |
| 2019/0096424 A1 | 3/2019 | Khoury et al. | |
| 2019/0115029 A1 | 4/2019 | Kracun et al. | |
| 2019/0172443 A1 | 6/2019 | Shechtman et al. | |
| 2019/0341055 A1* | 11/2019 | Krupka | G10L 17/02 |
| 2020/0043467 A1 | 2/2020 | Qian et al. | |
| 2020/0043480 A1 | 2/2020 | Shen et al. | |
| 2020/0090034 A1 | 3/2020 | Ramachandran et al. | |
| 2020/0135209 A1 | 4/2020 | Delfarah et al. | |
| 2020/0160846 A1 | 5/2020 | Itakura et al. | |
| 2020/0175961 A1 | 6/2020 | Thomson et al. | |
| 2020/0184997 A1 | 6/2020 | Lawson et al. | |
| 2020/0211544 A1 | 7/2020 | Mikhailov | |
| 2020/0285836 A1* | 9/2020 | Davis | G06K 9/6269 |
| 2020/0394511 A1* | 12/2020 | Kasai | G06N 3/044 |
| 2020/0401948 A1 | 12/2020 | Ma et al. | |
| 2021/0035563 A1 | 2/2021 | Cartwright et al. | |
| 2021/0043216 A1 | 2/2021 | Wang et al. | |
| 2021/0065680 A1 | 3/2021 | Audhkhasi et al. | |
| 2021/0104234 A1 | 4/2021 | Zhang et al. | |
| 2021/0117780 A1* | 4/2021 | Malik | G06F 9/4881 |
| 2021/0183383 A1 | 6/2021 | Volovich et al. | |
| 2021/0201890 A1 | 7/2021 | Wang et al. | |
| 2021/0224862 A1* | 7/2021 | Taifi | G06K 9/6268 |
| 2021/0233511 A1 | 7/2021 | Li et al. | |
| 2021/0241776 A1 | 8/2021 | Sivaraman et al. | |
| 2021/0256076 A1* | 8/2021 | McMurray | G06F 16/957 |
| 2021/0272013 A1* | 9/2021 | Szanto | G06F 40/30 |
| 2021/0279636 A1* | 9/2021 | Staar | G06N 20/00 |
| 2022/0004702 A1 | 1/2022 | Liang et al. | |
| 2022/0076665 A1 | 3/2022 | Baughman et al. | |
| 2022/0277053 A1* | 9/2022 | Krogh | G06F 40/205 |

OTHER PUBLICATIONS

Liu et al., "Large-Margin Softmax Loss for Convolutional Neural Networks", Proceedings of the 33rd International Conference on Machine Learning. arXiv:1612.02295v4 [stat.ML], Nov. 17, 2017. (pp. 1-10.).

Liu et al., "SphereFace: Deep Hypersphere Embedding for Face Recognition", Proceedings of the 2017 IEEE Conference on Computer Vision and Pattern Recognition. arXiv:1704.08063v4 [cs.CV]. Jan. 29, 2018. (pp. 1-13.).

Liu et al., "Deep Hyperspherical Learning", 31st Conference on Neural Information Processing Systems (NIPS 2017). arXiv:1711.03189v5[cs.LG] Jan. 30, 2018. (pp. 1-14.).

Liu et al., "Large Margin Softmax Loss for Speaker Verification" arXiv:1904.03479v1 [cs.SD] Apr. 6, 2019. (pp. 1-5.).

Narayanaswamy et al., "Designing and Effective Metric Learning Pipeline for Speaker Diarization", 2019 IEEE International Conference on Acoustics, Speech and Signal Processing. May 12, 2019. (pp. 5806-5810.).

Song et al., "Triplet Network with Attention for Speaker Diarization", arXiv:1808.01535v1 [eess.AS] Aug. 4, 2018. (pp. 1-5.).

Sztaho et al., "Deep learning methods in speaker recognition: a review", arXiv:1911.066165. Nov. 14, 2019. (pp. 1-12.).

Wang et al., "CosFace: Large Margin Cosine Loss for Deep Face Recognition", arXiv:1801.09414v2 [cs.CV] Apr. 3, 2018. (pp. 1-11.).

Wang et al., "Additive Margin Softmax for Face Verification", arXiv:1801.05599v4 [cs.CV] May 30, 2018. (pp. 1-7.).

List of IBM Patents or Patent Applications Treated as Related dated Mar. 3, 2020, 2 pages.

Office Action cited in corresponding U.S. Appl. No. 16/807,818 dated Mar. 22, 2022 (29 pgs).

Yu et al., "Ensemble Additive Margin Softmax for Speaker Verification", InICASSP 2019-2019 IEEE International Conference on Acoustics, Speech and Signal Processing (ICASSP) May 12, 2019 (pp. 6046-6050). IEEE.

* cited by examiner

METRIC LEARNING OF SPEAKER DIARIZATION

BACKGROUND

Technical Field

The present invention relates to metric learning of speaker diarization. More specifically, the present invention relates to metric learning of speaker diarization including converting an utterance into a feature vector.

Description of the Related Art

Speaker diarization is a technology that estimates who is speaking in a certain part of an audio recording. In speaker diarization, an utterance of a speaker may be converted into a feature vector in a multidimensional space by using metric learning. Thereafter, the feature vector may be clusterized to distinguish the speaker. As can be appreciated, utterances of the same speaker convert to identical feature vectors, and utterances of different speakers convert to distinct feature vectors.

SUMMARY

According to an embodiment of the present invention, a computer-implemented method includes obtaining training data including a plurality of utterances of a plurality of speakers in a plurality of acoustic conditions, preparing at least one machine learning model, each machine learning model including a common embedding model for converting an utterance into a feature vector and a classification model for classifying the feature vector, and training, by using the training data, the at least one machine learning model to perform classification by speaker and to perform classification by acoustic condition.

According to another embodiment of the present invention, a computer program product including one or more computer-readable storage mediums collectively storing program instructions that are executable by a processor or programmable circuitry to cause the processor or programmable circuitry to perform operations includes obtaining training data including a plurality of utterances of a plurality of speakers in a plurality of acoustic conditions, preparing at least one machine learning model, each machine learning model including a common embedding model for converting an utterance into a feature vector and a classification model for classifying the feature vector, and training, by using the training data, the at least one machine learning model to perform classification by speaker and to perform classification by acoustic condition.

According to another embodiment of the present invention, an apparatus includes a processor or a programmable circuitry and one or more computer-readable mediums collectively including instructions that, when executed by the processor or the programmable circuitry, cause the processor or the programmable circuitry to obtain training data including a plurality of utterances of a plurality of speakers in a plurality of acoustic conditions, prepare at least one machine learning model, each machine learning model including a common embedding model for converting an utterance into a feature vector and a classification model for classifying the feature vector, and train by using the training data, the at least one machine learning model to perform classification by speaker and to perform classification by acoustic condition.

As can be appreciated, the summary does not necessarily describe all necessary features of the embodiments of the present invention. Not all features described in the summary are essential to the present invention. The present invention may also be a sub-combination of the features described above.

DETAILED DESCRIPTION

Hereinafter, example embodiments of the present invention will be described. The example embodiments shall not limit the invention according to the claims, and the combinations of features described in the embodiments are not necessarily essential to the invention.

Figure 1:
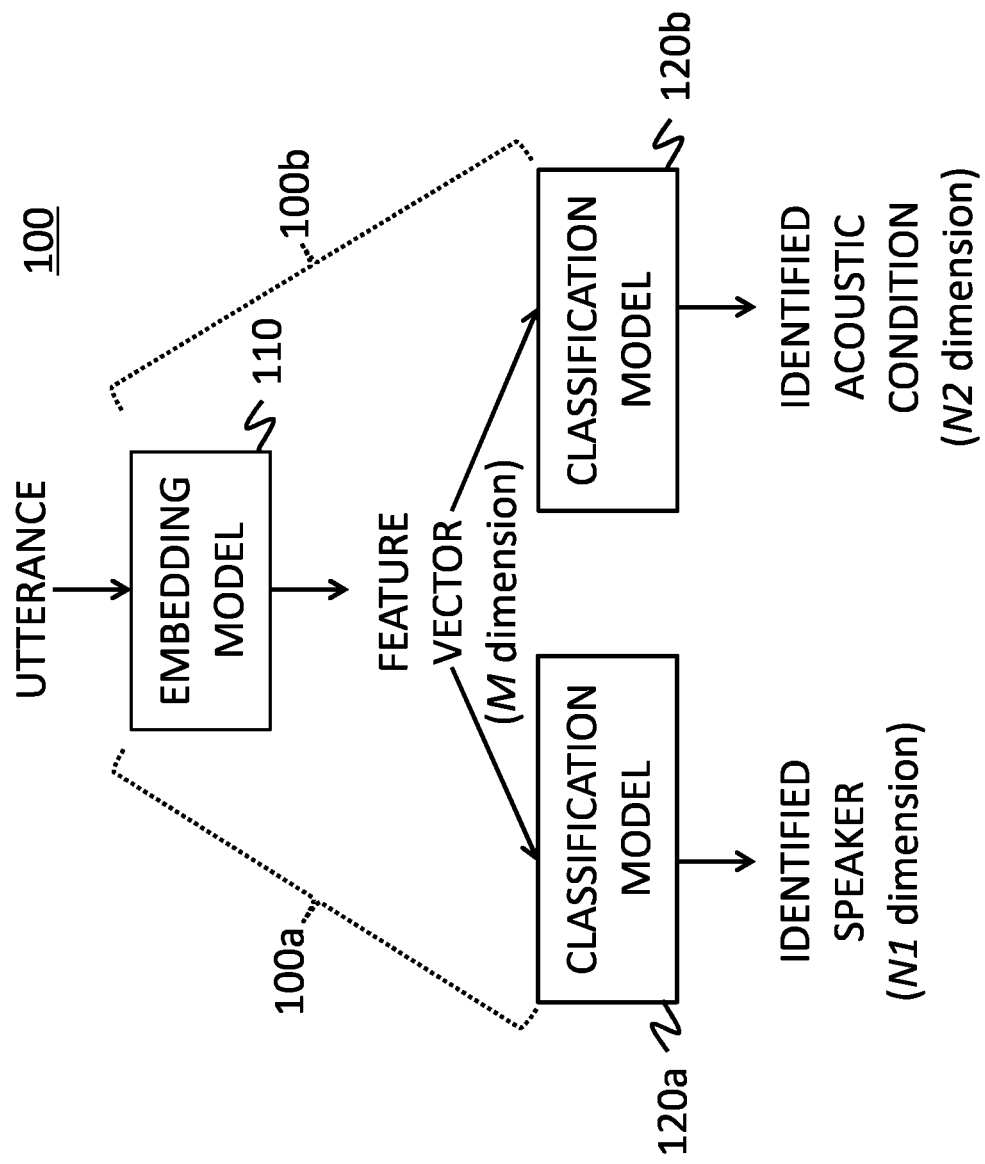
FIG. 1 shows a diagram of machine learning models according to an embodiment of the present invention.

FIG. 1 shows a diagram of machine learning models 100 according to an embodiment of the present invention. In the illustrated embodiment, the diagram includes two machine learning models 100a and 100b. The machine learning models 100a and 100b may be implemented on and performed by one or more computers, programmable circuitry, dedicated circuitry, or the like. Other embodiments include a single machine learning model trained to perform the functions of both machine learning models 100a and 100b. In this manner, embodiments can be thought of as including at least one machine learning model. It is envisioned that the at least one machine learning model 100 may be trained to perform classification by speaker and to perform classification by acoustic condition from an utterance of the speaker, as will be described in further detail hereinbelow.

In embodiments, the acoustic condition is a combination of factors that may affect the transfer function from a spoken sound to the recorded sound. Such factors may include acoustic characteristics of a room, a distance between a speaker and a microphone, characteristics of the microphone, characteristic of a recording device, and so on. As can be appreciated, the acoustic conditions are different if different microphones or recording devices are used. The acoustic conditions may also be different if the positions of speakers in a room or distances of speakers from a microphone are different even if the same microphone and the same recording device is used.

It is contemplated that the machine learning model 100a may include an embedding model 110 and a classification model 120a. In embodiments, the machine learning model 100b includes the common embedding model 110 and a classification model 120b.

The (common) embedding model 110 is a model that converts an utterance of a speaker into a feature vector that represents features or characteristics concerning speech of the speaker. The utterance may be a recording of audio spoken by or voice data of a certain speaker to be identified. The utterance may be a time-series data sequence or stream including a predetermined number of instantaneous values of audio or voice data. In embodiments, the feature vector may be a vector in an M-dimensional space. In one non-limiting embodiment, M is a positive integer value. The embedding model 110 has parameters that are trained or optimized by training. In embodiments, the embedding model 110 may be a neural network such as a convolutional neural network (CNN). It is envisioned that this neural network may receive the instantaneous values in input nodes in an input layer and output a feature vector having M vector elements from an output layer.

It is contemplated that the classification models 120a and 120b are models that classify the feature vector. The classification model 120a is a model that classifies the feature vector by speaker. In one non-limiting embodiment, the classification model 120a identifies the speaker from the feature vector and outputs an identification of the speaker. The identification of the speaker may be represented as an identification vector in an N1-dimensional space. In embodiments, N1 is an integer value that is more than 1 and each element of the identification vector corresponds to each speaker among N1 speakers. As can be appreciated, an element of the identification vector becomes a first value (e.g., "1") if the machine learning model 100a determines that a speaker corresponding to the element has spoken the utterance, and otherwise becomes a second value (e.g., "0.") In embodiments, each element of the identification vector represents a probability that the corresponding speaker has spoken the utterance. The identification of the speaker may also be a number or value that is assigned to the corresponding speaker. The classification model 120a also has parameters that are trained or optimized by training. In an embodiment, the classification model 120a may include a neural network such as a full connection neural network. It is envisioned that the neural network may receive the values of elements of the feature vector and output values of elements of the identification vector.

In embodiments, the classification model 120b is a model that classifies the feature vector by acoustic condition. It is contemplated that the classification model 120b identifies the acoustic condition from the feature vector and outputs an identification of the acoustic condition. The identification of the acoustic condition may be represented as an identification vector in an N2-dimensional space. In one non-limiting embodiment, N2 is an integer value that is more than 1 and each element of the identification vector corresponds to each acoustic condition among N2 acoustic conditions. As can be appreciated, an element of the identification vector becomes a first value (e.g., "1") if the machine learning model 100b determines that the utterance is recorded in the corresponding acoustic condition, and otherwise becomes a second value (e.g., "0.") In embodiments, each element of the identification vector represents a probability that the utterance is recorded in the corresponding acoustic condition. The identification of the acoustic condition may also be a number or a value that is assigned to the corresponding acoustic condition. The classification model 120b also has parameters that are trained or optimized by training. In one non-limiting embodiment, the classification model 120b may include a neural network such as a full connection neural network. It is contemplated that the neural network may receive the values of elements of the feature vector and output values of elements of the identification vector.

It is envisioned that by training the machine learning model 100a to perform classification by speaker and the machine learning model 100b to perform classification by acoustic condition, the common embedding model 110 is trained to output feature vectors that embed the feature of speakers and also the feature of acoustic conditions. As can be appreciated, the embedding model 110 performs well for speaker diarization of conversations recorded in asymmetric recording environments such as conversations over phones, meetings, and so on because the voices of each speaker are influenced by the acoustic condition associated with the speaker and then the characteristics of acoustic conditions can also be utilized to distinguish speakers.

Figure 2:
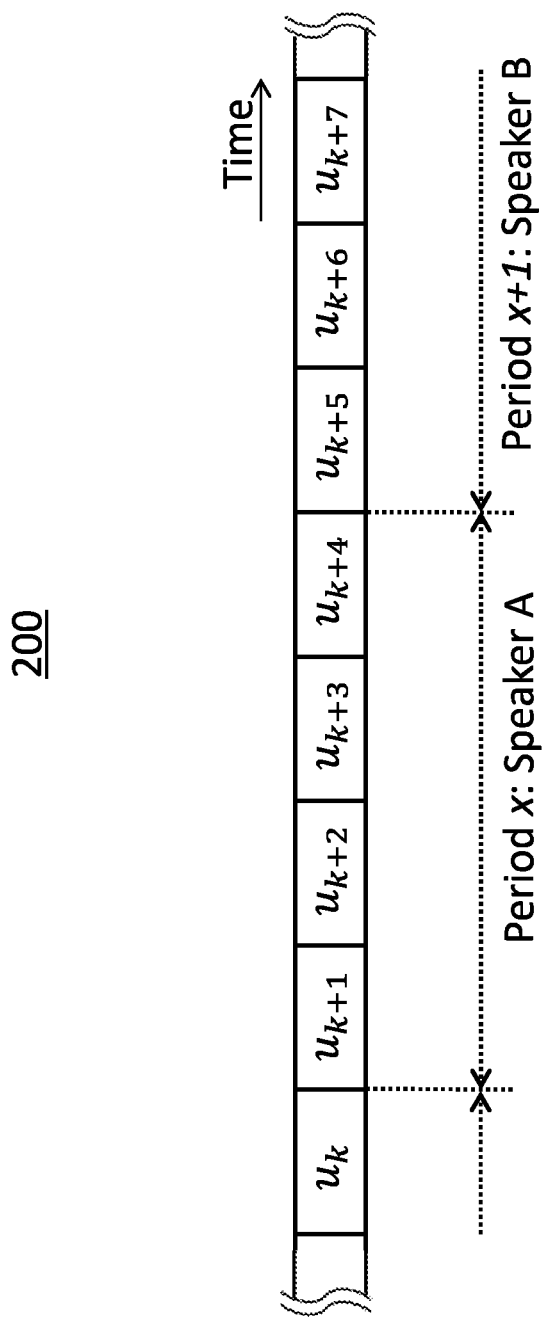
FIG. 2 shows audio data according to an embodiment of the present invention.

Turning now to FIG. 2, audio data 200 according to an embodiment of the present invention is illustrated. It is contemplated that the audio data 200 may be obtained live from one or more microphones or pre-recorded from an audio recorder, video recorder, any other recording device, directly or indirectly. As can be appreciated, the audio data 200 may be a recording of speech of one speaker, a conversation of a group of speakers, and so on. A single speech or a single conversation may be recorded in a single continuous recording. In embodiments, a single continuous recording may be stored as a single audio file 200.

As can be appreciated, in audio data of a single continuous recording, each speaker speaks one or more sentences, and these sentences may include a time-series sequence of utterances. With reference to FIG. 2, utterances $u_{k+1}$ to $u_{k+4}$ are spoken by speaker A in period x and utterances $u_{k+5}$ to $u_{k+7}$ are spoken by speaker B in the next period x+1. In this manner, the speech of a speaker is divided into pronunciations of words by, for example, using speech recognition, and each pronunciation of a word is treated as an utterance. In embodiments, the audio data 200 is divided into a plurality of pieces, each having a predetermined interval, and each piece of audio data is treated as an utterance.

It is envisioned that the training data for training the machine learning model, such as the machine learning models 100a and 100b, includes a plurality of utterances of a plurality of speakers in a plurality of acoustic conditions. In embodiments, each utterance in the training data is paired or annotated with an identification of a speaker corresponding to the utterance. Each utterance in the training data is also paired or annotated with an identification of an acoustic condition corresponding to the utterance. An identifier of a speaker may be assigned to each utterance, or a speaker of continuous utterances is marked by using metadata such as a set of a start time, an end time, and an identifier of a speaker between the start and the end time. It is contemplated that an identifier of an acoustic condition may also be assigned to each utterance, or an acoustic condition of continuous utterances may also be marked similarly.

Figure 3:
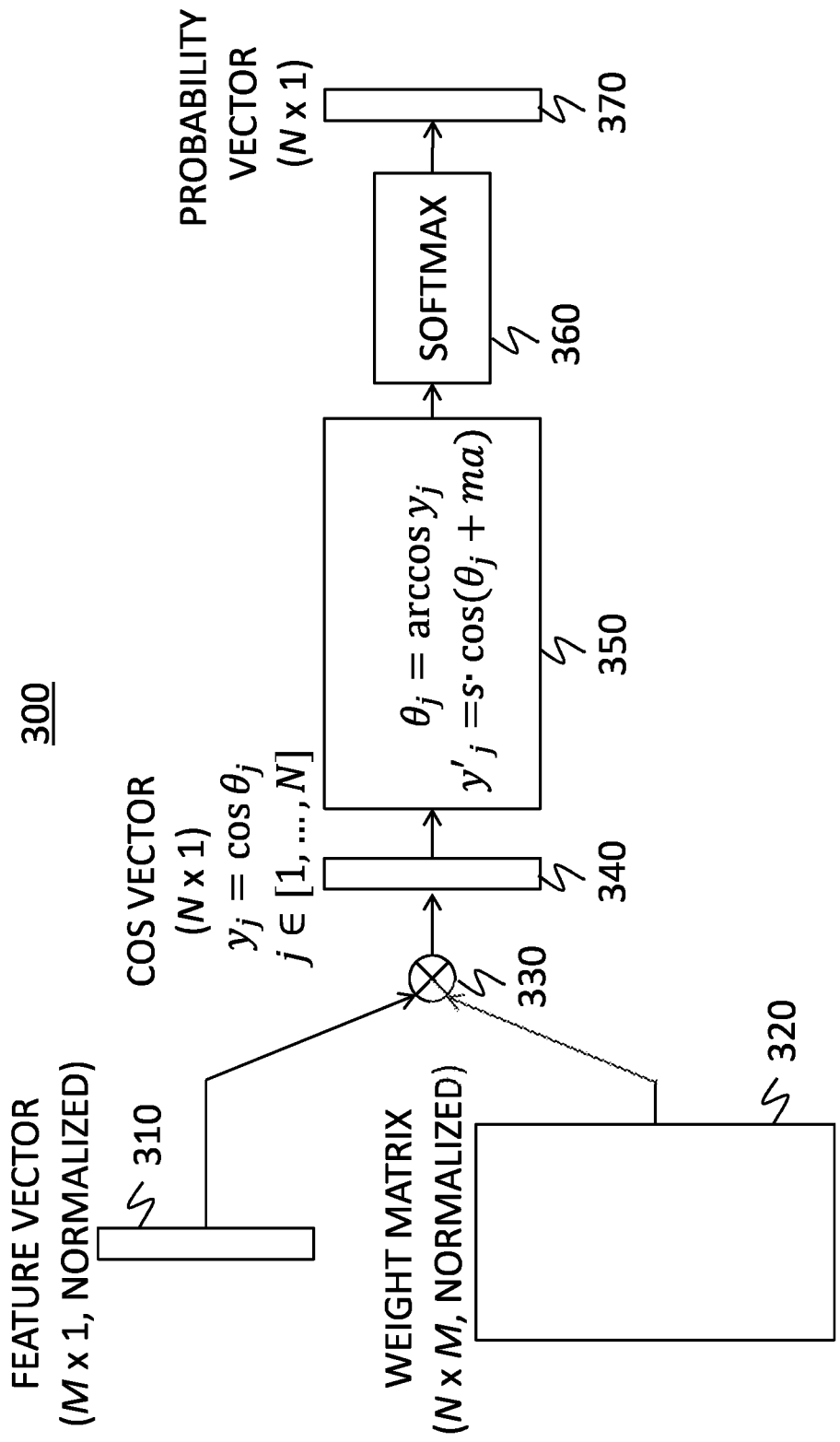
FIG. 3 shows a classification model according to an embodiment of the present invention.

FIG. 3 illustrates an example of a classification model 300 according to an embodiment of the present invention. In embodiments, the classification model 300 may be a detailed version of at least one of classification model 120a or 120b in FIG. 1. While the classification model 300 will generally be explained in reference to the machine learning model 100a and 100b in FIG. 1, it is contemplated that the classification model 300 can be implemented in other machine learning models as well.

In one non-limiting embodiment, an Additive Angular Margin Loss (ArcFace) method is adapted as a loss function. In embodiments, the classification model 300 may use any other loss functions and may include a weight matrix 320, a multiplier 330, a conversion unit 350, and a calculating unit 360.

The weight matrix 320 is an N by M matrix W where N is a number of speakers (N1) or a number of acoustic conditions (N2) to be identified and M is the dimension of the feature vector 310 from the embedding model. $W_j$ (j=1, . . . , N) denotes the j-th row of the weight matrix 320 and is also referred to as a row vector of the weight matrix 320. In one non-limiting embodiment, each row vector $W_j$ is normalized (i.e., the length of each row vector $W_j$ is 1.0).

The multiplier 330 receives the weight matrix 320, multiplies the weight matrix 320 by the feature vector 310 from the embedding model, such as the embedding model 110, and outputs a cosine vector 340. In embodiments, the feature vector 310 is also normalized by the embedding model 110 or normalized in the classification model 300. In this manner, each element $y_j$ of the cosine vector 340 is calculated as a cosine of the angle $\theta_j$ (i.e., $\cos \theta_j$) between the row vector $W_j$ of the weight matrix 320 and the feature vector 310.

In embodiments, the conversion unit 350 converts each element $y_j$ of the cosine vector 340 to $y'_j$ by applying hyperparameters of the classification model 300. In one non-limiting embodiment, the conversion unit 350 applies a scale s and a margin ma to each element $y_j$. The conversion unit 350 calculates $\theta_j$ from $y_j$ by calculating the arccosine of $y_j$ (i.e., $\theta_j$=arccos $y_j$). Then, the conversion unit 350 adds the margin ma to $\theta_j$, calculates a cosine of the added value $\theta_j$+ma, and multiplies the result by the scale s to obtain the converted element $y'_j$ (i.e., $y'_j$=s·cos ($\theta_j$+ma)).

The calculating unit 360 calculates a probability vector 370 by applying the softmax function to each element $y'_j$ from the conversion unit 350. In embodiments, if the classification model 300 is used for performing classification by speaker, the probability vector 370 represents, for each speaker j, the probability that the speaker j spoke the utterance input to the embedding model 110. In an implementation, the speaker corresponding to the highest value of the probability vector 370 is estimated as the speaker who spoke the utterance.

It is contemplated that if the classification model 300 is used for performing classification by acoustic condition, the probability vector 370 represents, for each acoustic condition j, the probability that the acoustic condition j is applied to the utterance input to the embedding model 110. In an implementation, the acoustic condition corresponding to the highest value of the probability vector 370 is estimated as the acoustic condition applied to the utterance.

In one non-limiting embodiment, the classification model 300 can identify a speaker or an acoustic condition from the feature vector 310. In embodiments, the classification model 300 may be flexible by including hyperparameters, such as scale s and margin ma, that can be adjusted from outside of the model.

Figure 4:
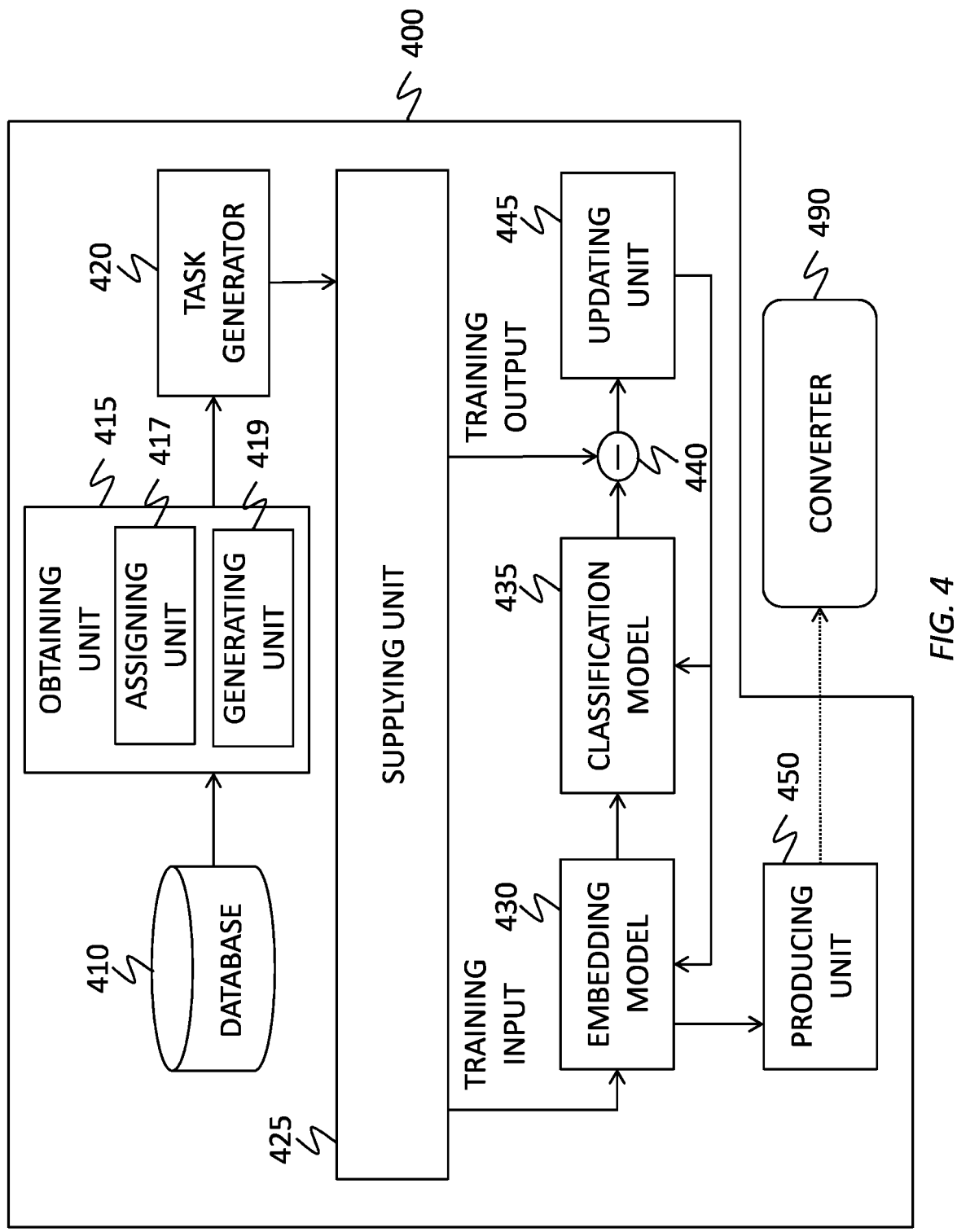
FIG. 4 shows an apparatus according to an embodiment of the present invention.

FIG. 4 shows an apparatus 400 according to an embodiment of the present invention. The apparatus 400 trains the at least one machine learning model and generates the converter 490 that implements the embedding model. The apparatus 400 includes a database 410, an obtaining unit 415, a task generator 420, a supplying unit 425, an embedding model 430, a classification model 435, a comparator 440, an updating unit 445, and a producing unit 450.

In embodiments, the database 410 stores training data that includes a plurality of utterances of a plurality of speakers in a plurality of acoustic conditions. The database 410 may store one or more audio files, each of which is obtained from a single continuous recording. Each utterance in the training data may be annotated with an identification of a speaker corresponding to the utterance. It is contemplated that each utterance in the training data may also be annotated with an identification of an acoustic condition corresponding to the utterance. In this manner, the annotations may be added to the training data by hand, or automatically added by recording in a special recording environment. As can be appreciated a microphone may be placed near each speaker to distinguish the speaker based on the voice level. It is envisioned that different identification of acoustic condition is assigned if a different microphone has received a voice from a speaker. In embodiments, the database 410 may be located outside of the apparatus 400. In one non-limiting embodiment, the database 410 may be a storage device, a storage server, cloud storage or the like that is connected to the apparatus 400.

In embodiments, the obtaining unit 415 is connected to the database 410 and obtains training data that includes a plurality of utterances of a plurality of speakers from the database 410. The obtaining unit 415 may include the assigning unit 417 and the generating unit 419. The assigning unit 417 annotates an identifier of an acoustic condition to each utterance if the utterance is not annotated with the identifier of an acoustic condition. The generating unit 419 generates training output data from the training data if the utterances are not annotated with the identifier of a speaker and the identification of an acoustic condition.

It is contemplated that the task generator 420 generates a plurality of tasks to train the at least one machine learning model 100. In this manner, each task may use one of a plurality of subsets of training data. Each subset of training data may include utterances of a different number of speakers among the plurality of speakers. Each subset of training data may also include utterances recorded in a different number of acoustic conditions among a plurality of distinguishable acoustic conditions.

The supplying unit 425 is connected to the task generator 420. In this manner, the supplying unit 425 prepares and trains, with the comparator 440 and the updating unit 445, the at least one machine learning model 100 to perform classification by speaker and to perform classification by acoustic condition. In embodiments, the supplying unit 425 performs, with the comparator 440 and the updating unit 445, the plurality of tasks from the task generator 420 to train the at least one machine learning model 100. For each task generated by the task generator 420, the supplying unit 425 supplies each utterance included in the corresponding subset of training data as training input data of the embedding model 430. The supplying unit 425 also supplies, for each utterance, a corresponding identification of the speaker or the acoustic condition as training output data to the comparator 440. It is contemplated that the supplying unit 425 may convert the identification of the speaker or the acoustic condition, such as a speaker ID or an acoustic condition ID, into the form of an identification vector, and supply the identification vector to the comparator 440.

In embodiments, the embedding model 430 is connected to the supplying unit 425. The embedding model 430 is executed on the apparatus 400 and converts the training input data (i.e., an utterance) into a feature vector. The embedding model 430 may be the embedding model 110 in FIG. 1 or a different embedding model. The classification model 435 is connected to the embedding model 430. The classification model 435 is executed on the apparatus 400 and identifies at least one of the speaker or the acoustic condition from the feature vector output from the embedding model 430. In one non-limiting embodiment, the classification model 435 may output a probability vector such as the probability vector 370 to the comparator 440. In embodiments, at least one of the embedding model 430 or the classification model 435 may be located outside of the apparatus 400.

The comparator 440 is connected to the supplying unit 425 and the classification model 435. In this manner, the comparator 440 receives, from the classification model 435, the identification of at least one of a speaker or an acoustic condition (i.e., the probability vector 370) estimated by the embedding model 430 and the classification model 435. It is contemplated that the comparator 440 may also receive the training output data (i.e., the identification vector that identifies at least one of the actual speaker or the acoustic condition relating to the utterance) from the supplying unit 425. The comparing unit 440 compares the output data from the classification model 435 and the training output data from the supplying unit 425. The comparing unit 440 may calculate an error or a difference between the output data from the classification model 435 and the training output data from the supplying unit 425.

In embodiments, the updating unit 445 is connected to the comparator 440. The updating unit 445 updates, during training, the embedding model 430 and the classification model 435 to reduce the error between the output data of the classification model 435 and the training output data of the supplying unit 425. It is envisioned that the updating unit 445 may set or update tunable parameters, such as weights and biases of the neural network in the embedding model 430 and the classification model 435. In one non-limiting embodiment, if the classification model 300 in FIG. 3 is used as the classification model 435, the updating unit 445 may set or update the weight matrix 320.

In embodiments, the producing unit 450 is connected to the embedding model 430. After training the embedding model 430, the producing unit 450 produces a converter 490 that converts an utterance into a feature vector by implementing the trained embedding model 430 as a conversion function of the converter 490. In embodiments, the converter 490 may include a model that has the same structure as the embedding model 430. Initially, the converter 490 has initial untrained parameters in the model. The producing unit 450 may output trained parameters of the embedding model 430 and store these trained parameters in a storage of the converter 490 so that the trained embedding model 430 is programmed in the converter 490. After this programming, the converter 490 may convert an utterance into a feature vector by applying the conversion function programmed in the model.

Figure 5:
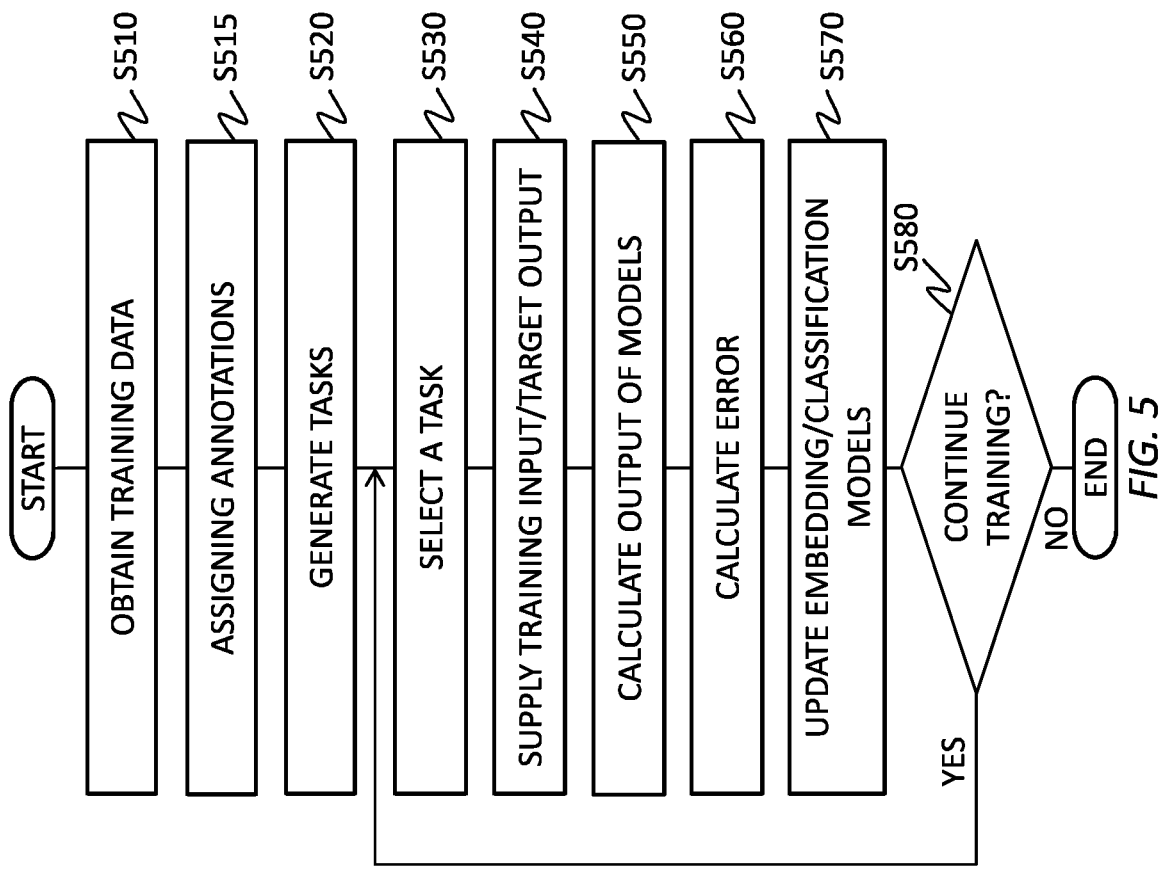
FIG. 5 shows an operational flow diagram according to an embodiment of the present invention.

FIG. 5 shows an operational flow according to an embodiment of the present invention. It is contemplated that the operations of FIG. 5 may be performed by, for example, the apparatus 400 and its components that were explained in reference to FIG. 4. In embodiments, the operations of FIG. 5 can also be performed by an apparatus including other components. As can be appreciated, while the operational flow of FIG. 5 will generally be explained in reference to the apparatus 400 and its components, it is contemplated that the operational flow can be performed by other apparatuses having different components as well.

At S510 (Step 510), the obtaining unit 415 obtains training data including a plurality of utterances of a plurality of speakers in a plurality of acoustic conditions from the database 410. The training data may include a plurality of continuous recordings. It is contemplated that each continuous recording may be stored in the database 410 as an audio file and may include utterances of the same or a different number of speakers.

At S515 (Step 515), the assigning unit 417 annotates an identifier of an acoustic condition to each utterance if the utterance is not annotated with the identifier of an acoustic condition. As can be appreciated, the acoustic condition for each speaker does not change in a single continuous recording. In this manner, each speaker tends to stay in the same position during a meeting, and then the same microphone and the same recording device are used for recording voices of the same speaker. In embodiments, if a telephone call is recorded in a call center, the customer and the staff continue to use the same telephone line. In this manner, the assigning unit 417 may assign a common identifier of an acoustic condition to each utterances of a common speaker obtained from a single continuous recording. The assigning unit 417 may assign different identifiers of acoustic conditions to utterances of different speakers or different recordings.

At S520, the task generator 420 prepares a plurality of machine learning models, such as the machine learning model 100a to 100b in FIG. 1, and generates a plurality of tasks to train the plurality of machine learning models. Each task uses one of a plurality of subsets of training data. In this manner, the task generator 420 may generate a first task to train a first machine learning model, such as the machine learning model 100a, by using a first subset of training data including utterances of a first number N1 of speakers among the plurality of speakers. The task generator 420 may also generate a second task to train a second machine learning model, such as the machine learning model 100b, by using a second subset of training data including utterances of a second number N2 of acoustic conditions among the plurality of acoustic conditions.

From S530 to S580, the apparatus 400 performs the plurality of tasks according to a multi-task training technique. As can be appreciated, the apparatus 400 performs the plurality of tasks concurrently to improve the accuracy of the machine learning model (i.e., the embedding model 430 and the classification model 435) for every task in parallel.

At S530, the supplying unit 425 selects one task that is to be performed in the current iteration. The supplying unit 425 may select each task among the plurality of tasks in order, such as in a round-robin fashion, or at random. The supplying unit 425 may equally select each task or may select tasks in different proportions. The classification model in the machine learning model of the selected task is selected as the classification model 435. In this manner, the classification model 435 works as the classification model 120a if the first task is selected and the classification model 435 works as the classification model 120b if the second task is selected. As can be appreciated, if the first task is selected, the apparatus 400 performs, at S540 to S570, the first task to train the first machine learning model such as the machine learning model 100a. If the second task is selected the apparatus 400 performs, at S540 to S570, a second task to train a second machine learning model such as the machine learning model 100b.

At S540, the supplying unit 425 selects an utterance and the corresponding identification of the speaker or the acoustic condition from the training data of the selected task. The supplying unit 425 may randomly select the utterance from the training data or sequentially select the utterance for each time the corresponding task is selected. The supplying unit 425 may keep some utterances unselected so that the apparatus 400 can use them for cross-validation.

In embodiments, the supplying unit 425 supplies the selected utterance to the embedding model 430 as the training input of the machine learning model. The supplying unit 425 also supplies the training output data to the comparator 440 as the training output of the machine learning model. The supplying unit 425 supplies the selected identification of the speaker as the training output data if the classification model 435 performs classification by speaker (e.g., the machine learning model 100*a*). In this manner, the apparatus 400 may train the first machine learning model 100*a* without using information of acoustic condition in the training data. The supplying unit 425 supplies the selected identification of the acoustic condition as the training output data if the classification model 435 performs classification by acoustic condition (e.g., the machine learning model 100*b*). In this manner, the apparatus 400 may train the second machine learning model 100*b* without using the information of speaker in the training data.

At S550, the embedding model 430 and the classification model 435 calculate the output of the machine learning model. The embedding model 430 converts the selected utterance into a feature vector, and the classification model 435 converts the feature vector into an identification of the speaker (the machine learning model 100*a*) or an identification of the acoustic condition (the machine learning model 100*b*). The classification model 435 outputs an identification vector (for example, the probability vector 370 in FIG. 3) as the identification of the speaker or the acoustic condition.

At S560, the comparator 440 calculates an error or a difference between the identification from the classification model 435 and the target identification corresponding to the selected utterance.

At S570, the updating unit 445 updates the parameters of the embedding model 430 and the classification model 435 to reduce the error or the difference. The updating unit 445 may update the parameters of the embedding model 430 and the classification model 435 by using a back-propagation technique from the output layer of the classification model 435 through to the input layer of the embedding model 430. In embodiments, the updating unit 445 may update the parameters of the embedding model 430 and the classification model 435 by using other techniques, such as Gradient Descent, as an example.

At S580, the apparatus 400 determines whether or not to continue the training. The apparatus 400 may perform cross-validation of the machine learning models and complete the training if the accuracy of the machine learning models is higher than a threshold. In the cross-validation, the supplying unit 425 supplies each utterance in a test set of training data to the embedding model 430 and supplies the corresponding identification of the speaker or the acoustic condition to the comparator 440. In embodiments, the updating unit 445 obtains an error for each utterance in the test set and accumulates the error relating to each utterance from the test set. The updating unit 445 may calculate an MSE (a mean square error) and determine to continue the training if the MSE is higher than a threshold. In one non-limiting embodiment, the apparatus 400 may determine to complete the training if the number of executed iterations exceeds a maximum number. If the apparatus 400 determines to continue the training, the apparatus 400 repeats the loop between S530 to S580. In this manner, the apparatus 400 trains the at least one machine learning model, such as the at least one model 100, until the embedding model 430 is trained to produce a conversion function for relating utterances to feature vectors including characteristics of speakers and acoustic conditions.

In embodiments, after training the one or more machine learning models, the producing unit 450 produces a converter such as the converter 490 by implementing the trained embedding model 430 as the conversion function of the converter 490. In embodiments, the producing unit 450 outputs the trained parameters of the trained embedding model 430 to produce the converter 490.

In one non-limiting embodiment, by training the embedding model 430 in combination with the classification model 435 (i.e., one or more classification models of the plurality of tasks), the apparatus 400 can optimize the embedding model 430 to output preferable feature vectors to distinguish or identify the speakers.

In one non-limiting embodiment, the apparatus 400 may receive a target ratio of performing tasks to train machine learning models (e.g., the machine learning model 100*a*) for speaker classification and performing tasks to train machine learning models (e.g., the machine learning model 100*b*) for acoustic condition classification. In this manner, the apparatus 400 may control the ratio of performing these tasks to be the target ratio at S530. It is envisioned that instead of receiving the target ratio, the apparatus 400 may change the ratio of performing these tasks and search the target ratio that causes the highest accuracy of the machine learning models.

Figure 6:
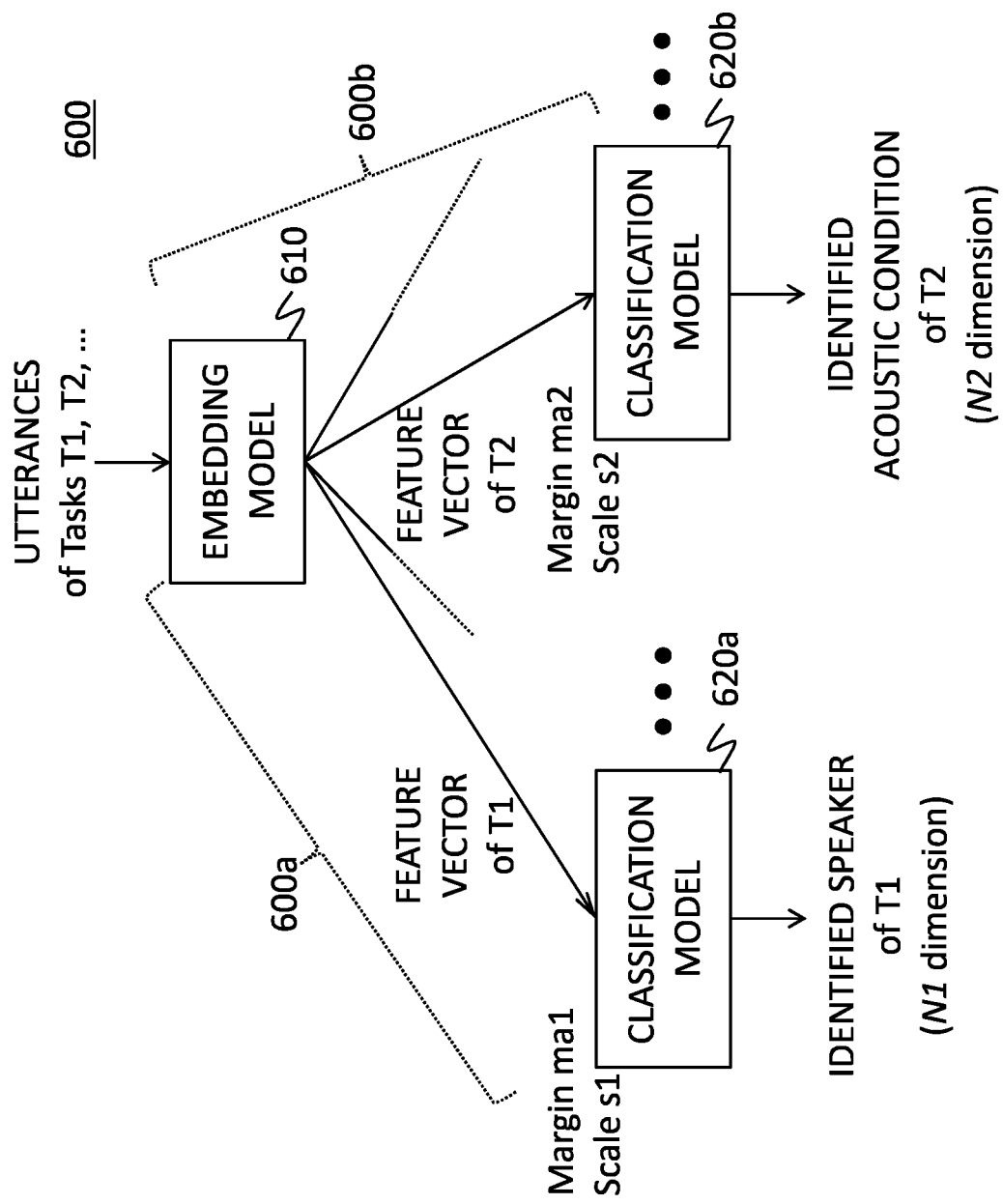
FIG. 6 shows a diagram of machine learning models according to another embodiment of the present invention.

FIG. 6 shows a diagram of machine learning models 600 according to another embodiment of the present invention. Each of the plurality of machine learning models 600 may include a detailed version of the embedding model 430 and the classification model 435 in FIG. 4 or a different version from the embedding model 430 and the classification model 435. While the plurality of machine learning models 600 will generally be explained in reference to the apparatus 400 and its components, it is contemplated that the plurality of machine learning models 600 may be implemented in other apparatuses as well.

In embodiments, the apparatus, such as the apparatus 400, prepares two or more machine learning models for performing classification by speaker. As can be appreciated, the task generator 420 may generate a first task as the main task of speaker classification using a first subset of training data and generate at least one task as subtasks of speaker classification. In this manner, the first subset may include utterances of the largest number (N1) of speakers among the plurality of speakers. The task generator 420 may obtain utterances of the first subset of training data by combining two or more audio recordings. In an embodiment, the task generator 420 may obtain utterances from every audio recording, and thereby the first subset includes the entire training data.

It is envisioned that the subsets for subtasks of speaker classification may include utterances of a number of speakers that are less than the number of speakers included in the first subset. The task generator 420 may obtain utterances of such subset of training data from a single continuous recording or a smaller number of continuous recordings. In embodiments, the subset may include utterances of one, two, or less than ten speakers, while the first subset may include utterances of thousands of speakers.

It is contemplated that the apparatus 400 may also prepare two or more machine learning models for performing classification by acoustic condition. In embodiments, the task generator 420 may generate a second task as the main task of acoustic condition classification using a second subset of training data and generate at least one task as subtasks of acoustic condition classification. In this manner, the second subset may include utterances of the largest number (N2) of acoustic conditions among the plurality of acoustic conditions. The task generator 420 may obtain utterances of the second subset of training data by combining two or more audio recordings. In embodiments, the task generator 420 may obtain utterances from every audio recording, and thereby the second subset includes the entire training data.

In embodiments, the subsets for subtasks of acoustic condition classification may include utterances of a number of acoustic conditions that are less than the number of acoustic conditions included in the second subset. The task generator 420 may obtain utterances of such subset of training data from a single continuous recording or a smaller number of continuous recordings. It is contemplated that the subset may include utterances of one, two, or less than ten acoustic conditions, while the second subset may include utterances of thousands of acoustic conditions.

In embodiments, the plurality of machine learning models 600 includes a machine learning model 600*a* that includes an embedding model 610 and a classification model 620*a*. It is envisioned that the embedding model 610 may be the embedding model 110 in FIG. 1, the embedding model 430 in FIG. 4, or a different embedding model. The classification model 620*a* may be the classification model 120*a* in FIG. 1, the classification model 435 in FIG. 4, or a different classification model. The classification model 620*a* is connected to the embedding model 610. The plurality of machine learning models 600 may also include at least one machine learning model for speaker classification. In embodiments, tach of the at least one machine learning model for speaker classification includes the common embedding model 610 and a different classification model.

It is contemplated that the plurality of machine learning models 600 may also include a machine learning model 600*b* that includes the common embedding model 610 and a classification model 620*b*. The classification model 620*b* may be the classification model 120*b* in FIG. 1, the classification model 435 in FIG. 4, or a different classification model. The classification model 620*b* is connected to the embedding model 610. The plurality of machine learning models 600 may also include at least one machine learning model for acoustic condition classification. In embodiments, each of the at least one machine learning model for acoustic condition classification includes the common embedding model 610 and a different classification model.

In embodiments, the structures of the classification models 620 are different if the number of speakers or acoustic conditions to be identified (N1, . . . , N2, . . . in FIG. 6) is different because the number of the output nodes is determined based on the number of speakers or the number of acoustic conditions. If the number of speakers or the number of acoustic conditions is the same, then the same structure may be used. It is contemplated that at least one hyperparameter of one or more classification models 620 can also be different. In one non-limiting embodiment, the plurality of classification models 620 may have different structures (e.g., different number of intermediate nodes, different number of layers) or may use different machine learning models.

In embodiments, the classification model 620*a* is used for the main task of speaker classification, and one or more classification models (not shown in FIG. 6) are used for the subtasks of speaker classification. It is envisioned that the apparatus, such as the apparatus 400, may use a value of at least one hyperparameter of the classification model 620*a* for the main task that is different from the value of the at least one hyperparameter of at least one of the subtask. In embodiments, the apparatus 400 may use a different margin ma between the main task and the subtasks. The value of margin ma1, which is a hyperparameter of the classification model 620*a* for the main task, may be different from the value of margin of the classification models for a subtask of speaker classification. The margins for one or more subtasks can be larger than the margin ma1 for the main task. In an implementation, the task generator 420 may set a larger margin ma to a task using a subset including utterances of a smaller number of speakers. As can be appreciated, by setting larger margins for subtasks than the main task, the embedding model 610 can be improved to output more separate feature vectors for distinguishing a smaller number of speakers while it can still be used to convert an utterance into a feature vector that represents characteristics of the speaker.

In embodiments, the classification model 620*b* is used for the main task of acoustic condition classification, and one or more classification models (not shown in FIG. 6) are used for the subtasks of acoustic condition classification. The apparatus 400 may set hyperparameters of the classification models for the main task and the subtasks of acoustic condition classification in a manner similar to the way that the apparatus 400 sets hyperparameters of the classification models of speaker classification.

In embodiments, a training unit such as the updating unit 445 in FIG. 4 changes or optimizes at least one hyperparameter for each task to improve the accuracy of the machine learning model including the embedding model 610 and one classification model 620 corresponding to each task.

Figure 7:
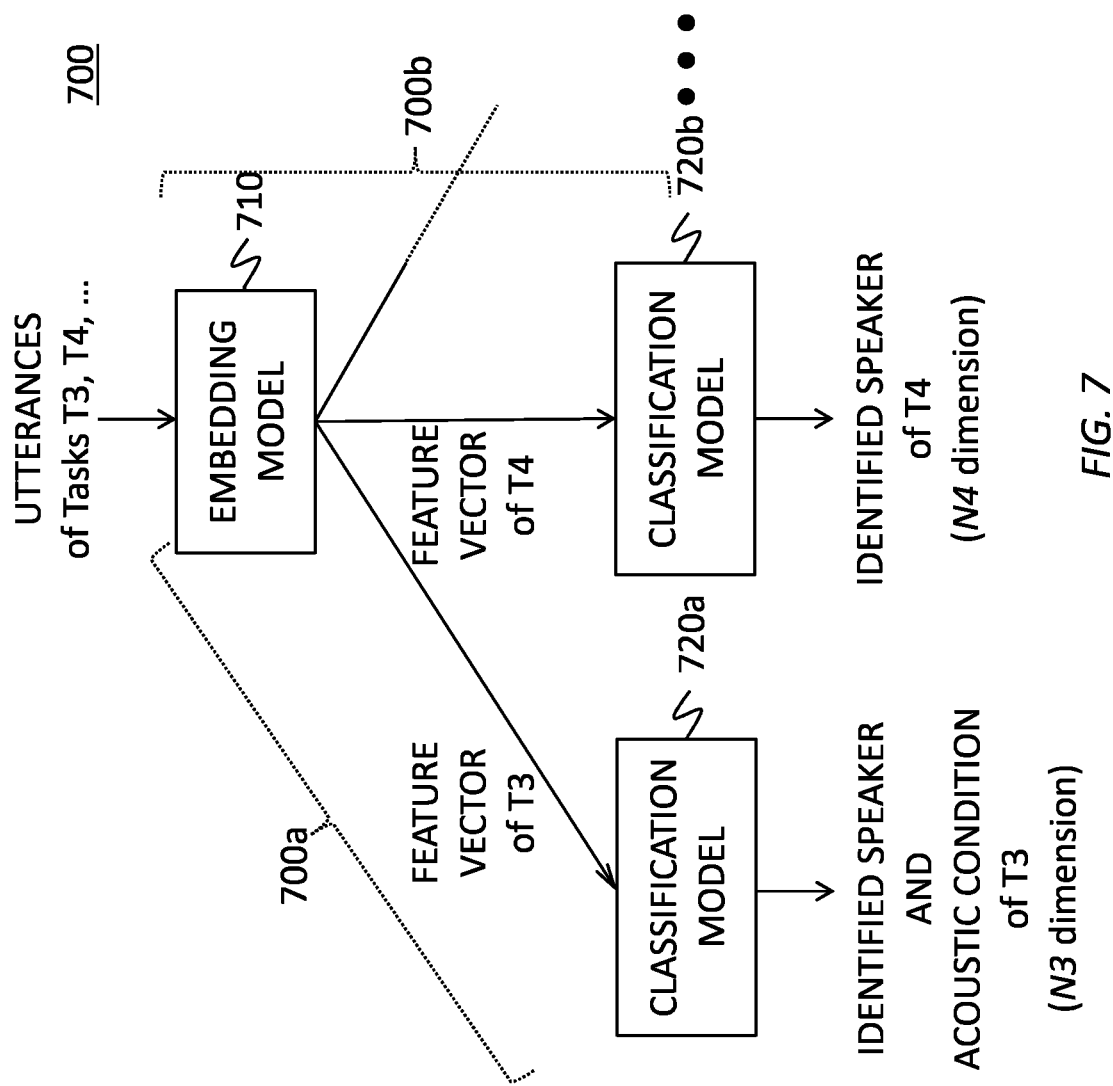
FIG. 7 shows a diagram of machine learning models according to yet another embodiment of the present invention.

FIG. 7 shows a diagram of machine learning models 700 according to yet another embodiment of the present invention. It is contemplated that each of the plurality of machine learning models 700 may include a detailed version of the embedding model 430 and the classification model 435 in FIG. 4 or a different version from the embedding model 430 and the classification model 435. While the plurality of machine learning models 700 will generally be explained in reference to the apparatus 400 and its components, it is contemplated that the plurality of machine learning models 700 can be implemented in other apparatuses as well.

In one non-limiting embodiment, the apparatus, such as the apparatus 400, prepares one or more machine learning models 700*a* to 700*b* for performing classification by speaker and classification by acoustic condition. In embodiments, the task generator 420 may generate a third task to train a third machine learning model 700*a* including the embedding model 710 and a third classification model 720*a* for classifying the feature vector by speaker and acoustic condition. In this manner, the third subset may include a plurality of sets of an utterance and an identifier that identifies a speaker and an acoustic condition of the corresponding utterance. As illustrated in FIG. 7, the identifier of the speaker and the acoustic condition is represented as a vector in N3 dimension.

It is contemplated that the generating unit 419 of the obtaining unit 415 may generate this identifier for each utterance in the third subset of the training data. In an implementation, the generating unit 419 may generate, for each utterance, a training output data of the third classification model 700*a* by extracting common features of utterances among the plurality of utterances having a common speaker and a common acoustic condition. The generating unit 419 may generate a vector that represents a difference between the distribution of utterances with and without the utterances having the particular speaker and the particular acoustic condition. The generating unit 419 may generate an i-vector that represents the difference between the distributions, and use it as the training output data.

In embodiments, the apparatus 400 trains the machine learning model 700a to output the training output data representing a speaker and an acoustic condition from an utterance of the speaker and the acoustic condition. In this manner, the embedding model 710 is trained to output feature vectors that include the feature of speakers and also the feature of acoustic conditions by using one machine learning model 700a.

It is envisioned that the plurality of machine learning models 700 may further include the machine learning model 700b including the embedding model 710 and the classification model 720b. As shown in FIG. 7, the apparatus 400 may train the embedding model 710 and the classification model 720b for classifying the feature vector by speaker. In embodiments, the apparatus 400 may train the machine learning model 700b for classifying speakers or acoustic conditions, or classifying both speakers and acoustic conditions. The plurality of machine learning models 700 may further include one or more machine learning models each of which include the embedding model 710 and a classification model to classify the feature vector by at least one of speaker or acoustic condition.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
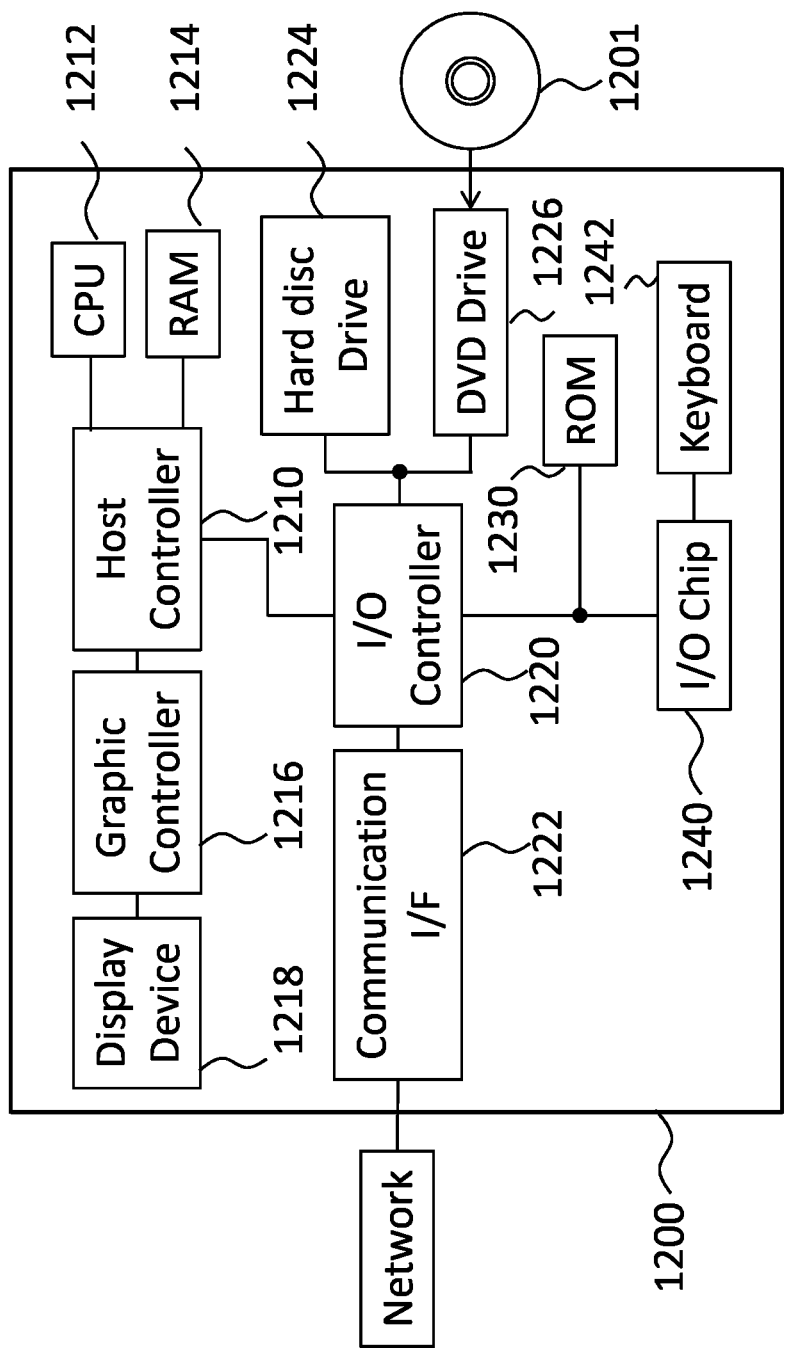
FIG. 8 shows a hardware configuration of a computer according to an embodiment of the present invention.

FIG. 8 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

Many of the embodiments of the present invention include artificial intelligence, and include neural networks in particular. Some of the foregoing embodiments describe specific types of neural networks. However, a neural network usually starts as a configuration of random values. Such untrained neural networks must be trained before they can be reasonably expected to perform a function with success. Once trained, a neural network may not require further training. In this way, a trained neural network is a product of the process of training an untrained neural network.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
    obtaining training data including a plurality of utterances of a plurality of speakers in a plurality of acoustic conditions;
    preparing at least one machine learning model, each machine learning model including a common embedding model for converting an utterance into a feature vector and a classification model for classifying the feature vector; and
    training, by using the training data, the at least one machine learning model to perform classification by speaker with a speaker identifier output and to perform classification by acoustic condition with an acoustic condition identifier output, including:
        performing, by using the training data, a first task to train a first machine learning model including the embedding model and a first classification model for classifying the feature vector by speaker; and
        performing, by using the training data, a second task to train a second machine learning model including the embedding model and a second classification model for classifying the feature vector by acoustic condition.

2. The computer-implemented method of claim 1, wherein the training includes training the at least one machine learning model until the embedding model is trained to produce a conversion function for relating utterances to feature vectors including characteristics of speakers and acoustic conditions.

3. The computer-implemented method of claim 1, further comprising producing a converter that converts an utterance into a feature vector by implementing the trained embedding model as a conversion function of the converter.

4. The computer-implemented method of claim 1, wherein
    the performing the first task is for training the first machine learning model without using information of acoustic condition in the training data; and
    the performing the second task is for training the second machine learning model without using information of speaker in the training data.

5. The computer-implemented method of claim 1, wherein the obtaining the training data includes assigning a common identifier of an acoustic condition to each utterances of a common speaker obtained from a single continuous recording.

6. The computer-implemented method of claim 4, wherein the training includes performing, by using the training data, a third task to train a third machine learning model including the embedding model and a third classification model for classifying the feature vector by speaker and acoustic condition.

7. The computer-implemented method of claim 6, wherein the obtaining the training data further includes generating, for each utterance, a training output data of the third classification model by extracting common features of utterances among the plurality of utterances having a common speaker and a common acoustic condition, and
    wherein the performing the third task includes training the third machine learning model to output the training output data representing a speaker and an acoustic condition from an utterance of a speaker and an acoustic condition.

8. The computer-implemented method of claim 7, wherein the generating includes generating an i-vector as the training output data.

9. The computer-implemented method of claim 1, wherein each of the plurality of acoustic conditions corresponds to a transfer function that is affected by a factor selected from the group consisting of acoustic characteristics of a room, a distance between a speaker and a microphone, characteristics of a microphone, and characteristics of a recording device.

10. A computer program product including one or more computer-readable storage mediums collectively storing program instructions that are executable by a processor or programmable circuitry to cause the processor or programmable circuitry to perform operations comprising:
    obtaining training data including a plurality of utterances of a plurality of speakers in a plurality of acoustic conditions;
    preparing at least one machine learning model, each machine learning model including a common embedding model for converting an utterance into a feature vector and a classification model for classifying the feature vector; and
    training, by using the training data, the at least one machine learning model to perform classification by speaker with a speaker identification output and to perform classification by acoustic condition with an acoustic condition identifier output, including:
        performing, by using the training data, a first task to train a first machine learning model including the embedding model and a first classification model for classifying the feature vector by speaker; and performing, by using the training data, a second task to train a second machine learning model including the embedding model and a second classification model for classifying the feature vector by acoustic condition.

11. The computer program product of claim 10, wherein the operations further comprise producing a converter that converts an utterance into a feature vector by implementing the trained embedding model as a conversion function of the converter.

12. The computer program product of claim 11, wherein the training includes performing, by using the training data, a third task to train a third machine learning model including the embedding model and a third classification model for classifying the feature vector by speaker and acoustic condition.

13. The computer program product of claim 12, wherein the obtaining the training data further includes generating, for each utterance, a training output data of the third classification model by extracting common features of utterances among the plurality of utterances having a common speaker and a common acoustic condition, and wherein the performing the third task includes training the third machine learning model to output the training output data representing a speaker and an acoustic condition from an utterance of a speaker and an acoustic condition.

14. An apparatus comprising:

a processor or a programmable circuitry; and one or more computer-readable storage mediums collectively including instructions that, when executed by the processor or the programmable circuitry, cause the processor or the programmable circuitry to:

obtain training data including a plurality of utterances of a plurality of speakers in a plurality of acoustic conditions;

prepare at least one machine learning model, each machine learning model including a common embedding model for converting an utterance into a feature vector and a classification model for classifying the feature vector; and train by using the training data, the at least one machine learning model to perform classification by speaker with a speaker identification output and to perform classification by acoustic condition with an acoustic condition identifier output, including:

performing, by using the training data, a first task to train a first machine learning model including the embedding model and a first classification model for classifying the feature vector by speaker; and performing, by using the training data, a second task to train a second machine learning model including the embedding model and a second classification model for classifying the feature vector by acoustic condition.

15. The apparatus of claim 14, wherein executing the instructions further causes the processor or the programmable circuitry to produce a converter that converts an utterance into a feature vector by implementing the trained embedding model as a conversion function of the converter.

16. The apparatus of claim 14, wherein the training includes performing, by using the training data, a third task to train a third machine learning model including the embedding model and a third classification model for classifying the feature vector by speaker and acoustic condition.

17. The apparatus of claim 16, wherein the obtaining the training data further includes generating, for each utterance, a training output data of the third classification model by extracting common features of utterances among the plurality of utterances having a common speaker and a common acoustic condition, and wherein the performing the third task includes training the third machine learning model to output the training output data representing a speaker and an acoustic condition from an utterance of a speaker and an acoustic condition.

* * * * *